United States Patent [19]
Nakatsuji et al.

[11] Patent Number: 6,045,732
[45] Date of Patent: Apr. 4, 2000

[54] METHOD FOR PRODUCING A MULTI-LAYER MOLDED ARTICLE

[75] Inventors: Yoshihiro Nakatsuji, Osaka; Hiroyuki Sugimoto, Shiga; Kohsuke Ohtani, Osaka; Toshio Igarashi, Kyoto; Satoru Funakoshi, Osaka; Harunori Fujita, Chiba, all of Japan

[73] Assignee: Sumitomo Chemical Company, Limited, Osaka, Japan

[21] Appl. No.: 08/955,425

[22] Filed: Oct. 22, 1997

Related U.S. Application Data

[62] Division of application No. 08/556,421, Nov. 9, 1995, abandoned.

[30] Foreign Application Priority Data

Nov. 10, 1994 [JP] Japan .................................. 6-276571
Dec. 20, 1994 [JP] Japan .................................. 6-316689

[51] Int. Cl.$^7$ ............................ B29C 41/18; B29C 44/06
[52] U.S. Cl. ......................... 264/46.4; 264/54; 264/255; 264/259; 264/302; 156/242
[58] Field of Search .......................... 264/54, 46.4, 302, 264/259, 255; 156/79, 242

[56] References Cited

U.S. PATENT DOCUMENTS

| | | | |
|---|---|---|---|
| 4,524,157 | 6/1985 | Stamberger ............................... | 521/156 |
| 4,720,524 | 1/1988 | Ohmae et al. ........................... | 525/173 |
| 4,737,548 | 4/1988 | Kojima et al. ........................... | 525/193 |
| 5,006,188 | 4/1991 | Usui et al. ............................... | 156/245 |
| 5,254,402 | 10/1993 | Okubo et al. ........................... | 428/317.7 |
| 5,281,376 | 1/1994 | Hara et al. ............................... | 264/46.4 |
| 5,395,881 | 3/1995 | Spelthann ................................. | 525/63 |

FOREIGN PATENT DOCUMENTS

| | | |
|---|---|---|
| 0 027 587 A1 | 4/1981 | European Pat. Off. . |
| 0 480 769 A2 | 4/1992 | European Pat. Off. . |
| 0 480 770 A3 | 4/1992 | European Pat. Off. . |
| 0 540 941 A1 | 5/1993 | European Pat. Off. . |
| 0 662 493 A1 | 7/1995 | European Pat. Off. . |

OTHER PUBLICATIONS

Database WPI, Week 9426, Derwent Publications Ltd., London, GB; AN 94–210957 XP002015299 & JP–A–06 145 610 (undated).

Database WPI, Week 8917, Derwent Publications Ltd., London, GB; AN 89–127691 XP002015300 & JP–A–01 075 229 (undated).

*Primary Examiner*—Allan R. Kuhns
*Attorney, Agent, or Firm*—Pillsbury Madison & Sutro LLP Intellectual Property Group

[57] ABSTRACT

A multi-layer molded article having a skin material layer made of a vinyl chloride resin, a propylene resin core, and an adhesive layer present between the skin material layer and the core, in which the adhesive layer includes (A) a layer having (a) a sublayer containing a polyester resin and an epoxy group-containing ethylene copolymer, which is bonded to the skin material of the vinyl chloride resin, and (b) a sublayer containing at least one copolymer selected from an ethylene copolymer and an epoxy group-containing copolymer, which is bonded to said propylene resin core, or (B) a layer obtained from an ethylene resin composition containing a polybasic carboxylic acid and an epoxy-group containing copolymer (c) which contains ethylene units, unsaturated carboxylic acid glycidyl ester units or unsaturated glycidyl ether units and an ethylenically unsaturated ester units other than the unsaturated carboxylic acid glycidyl ester units.

8 Claims, 2 Drawing Sheets

METHOD FOR PRODUCING A MULTI-LAYER MOLDED ARTICLE

This is a division of application Ser. No. 08/556,421, filed on Nov. 9, 1995, which was abandoned upon the filing hereof.

BACKGROUND OF THE INVENTION

1. Field of the Invention

The present invention relates to a multi-layer molded article, in particular, a multi-layer molded article having a specific adhesive layer between a vinyl chloride resin skin material layer and a propylene resin core, and a method for producing the same.

2. Description of the Related Art

Hitherto, a multi-layer molded article having minute uneven decorations such as leather grain and stitch on its surface is used as an interior material of an automobile, and so on.

In general, the multi-layer molded article is produced by supplying a vinyl chloride resin skin material having a minute uneven decoration on a molding surface of a mold for foam molding of polyurethane by contacting a surface having the uneven decoration to the molding surface of the mold, supplying a rigid polyurethane as a core material, and foaming and hardening the polyurethane. However, since the multi-layer molded article having the rigid polyurethane core should have a thick core to provide sufficient mechanical strength, it is unsatisfactory to reduce a thickness and weight of the multi-layer molded article.

As one of the solutions for the above problem, a multi-layer molded article comprising a core made of a propylene resin which has better strength than the polyurethane is proposed. For example, Japanese Patent KOKAI Publication No. 251206/1988 discloses a multi-layer molded article comprising a skin material layer of a vinyl chloride resin, and a propylene resin core, and Japanese Patent KOKAI Publication No 198812/1990 discloses a multi-layer molded article comprising a skin material layer having a surface layer made of a vinyl chloride resin (a non-foam layer) and a backing layer made of polyolefin and a vinyl chloride resin (a foam layer), and a propylene resin core. However, the disclosed multi-layer molded articles have insufficient adhesion between the skin material layer and the core so that the skin material layer is easily peeled off from the core.

SUMMARY OF THE INVENTION

One object of the present invention is to provide a multi-layer molded article comprising a skin material layer made of a vinyl chloride resin and a propylene resin core which are not or hardly peeled off.

Another object of the present invention is to provide a method for producing such multi-layer molded article.

According to the present invention, there is provided a multi-layer molded article comprising a skin material layer made of a vinyl chloride resin, a propylene resin core, and an adhesive layer present between said skin material layer and said core, wherein said adhesive layer comprises:

(A) a layer having
  (a) a first sublayer comprising 30 to 90 wt. % of a polyester resin, and a rest of an epoxy group-containing ethylene copolymer and optionally an ethylene copolymer, which is bonded to said skin material of the vinyl chloride resin, and
  (b) a second sublayer comprising at least one copolymer selected from the group consisting of an ethylene copolymer and an epoxy group-containing copolymer, and optionally a polyolefin, which is bonded to said propylene resin core, or (B) a layer obtained from an ethylene resin composition comprising 100 wt. parts of an epoxy-group containing copolymer (c) which comprises 20 to 99.9 wt. % of ethylene units, 0.1 to 30 wt. % of unsaturated carboxylic acid glycidyl ester units or unsaturated glycidyl ether units, and 0 to 50 wt. % of an ethylenically unsaturated ester units other than the unsaturated carboxylic acid glycidyl ester units, 0.1 to 50 wt. parts of a polybasic carboxylic acid having at least two carboxyl groups, and optionally 0.1 to 20 wt. parts of a heat decomposable blowing agent.

DETAILED DESCRIPTION OF THE INVENTION

Figure 1:
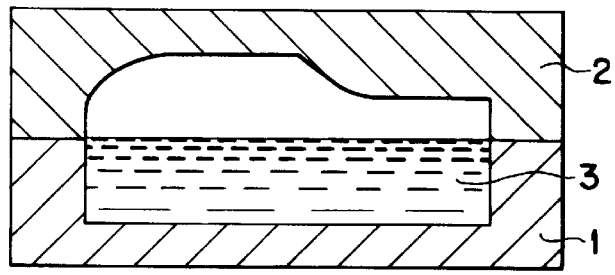
FIG. 1 is a cross sectional view of a container containing a powder composition for a skin material, and a mold for powder molding.

The multi-layer molded article of the present invention comprises the skin material layer of the vinyl chloride resin, the propylene resin core, and the adhesive layer which is present between the skin material layer and the core, and the adhesive layer comprises (A) a layer having
  (a) a first sublayer comprising 30 to 90 wt. % of a polyester resin, and a rest of an epoxy group-containing ethylene copolymer and optionally an ethylene copolymer, which is bonded to said skin material of the vinyl chloride resin, and
  (b) a second sublayer comprising at least one copolymer selected from the group consisting of an ethylene copolymer and an epoxy group-containing copolymer, and optionally a polyolefin, which is bonded to said propylene resin core, or (B) a layer obtained from an ethylene resin composition comprising 100 wt. parts of an epoxy-group containing copolymer (c) which comprises 20 to 99.9 wt. % of ethylene units, 0.1 to 30 wt. % of unsaturated carboxylic acid glycidyl ester units or unsaturated glycidyl ether units, and 0 to 60 wt. % of an ethylenically unsaturated ester units other than the unsaturated carboxylic acid glycidyl ester units, 0.1 to 50 wt. parts of a polybasic carboxylic acid having at least two carboxyl groups, and optionally 0.1 to 20 wt. parts of a heat decomposable blowing agent.

First, the layer (A) of the adhesive layer is explained.

The polyester resin which is one of the components of the sublayer (a) in the layer (A) is a polycondensate of a carboxylic acid and a glycol, and comprises carboxylic acid units and glycol units.

Examples of the carboxylic acid are aromatic dicarboxylic acids such as terephthalic acid, isophthalic acid, phthalic acid, 2,6-naphthalenedicarboxylic acid, diphenyldicarboxylic acid, etc.; aliphatic dicarboxylic acids such as succinic acid, adipic acid, azelaic acid, sebacic acid, decamethylenedicarboxylic acid, dimer acids, etc.; oxycarboxylic acids such as p-(2-hydroxyethoxy)benzoic acid, etc.; lactones such as ε-caprolaotone, etc. While the polyester resin may comprise only one kind of the carboxylic acid unit, it may comprise two or more kinds of the carboxylic acid units. Preferably the polyester resin comprises terephthalic acid units. When the terephthalic acid units are contained but no isophthalic acid unit is contained, the number of the terephthalic acid units is from 40 to 100% of the total number of the whole carboxylic acid units. When both the terephthalic acid units and the isophthalic acid units are contained, the total number of the both acid units is from 40 to 100% of the total number of the whole carboxylic acid units.

Examples of the glycol are ethylene glycol, diethylene glycol, polyethylene glycol, 1,2-propylene glycol, 1,3-propylene glycol, 1,4-butanediol, 1,4-cyclohexanedimethanol, neopentyl glycol, 1,5-pentanediol, 1,6-hexanediol, N-methyldiethanolamine, and so on. Among them, ethylene glycol, 1,4-butanediol and neopentyl glycol are preferred. While the polyester resin may comprise only one kind of the glycol units, it may comprise two or more kinds of the glycol units.

The polyester resin usually has a melting point of about 50 to 200° C., preferably 80 to 150° C., and a reduced viscosity η of about 0.5 to 2.0, preferably 0.8 to 1.8.

The polyester resins may be used independently or in combination of two or more of them.

The polyester resin to be used in the present invention may be prepared by any one of conventional processes. For example, the polyester resin may be a resin prepared by the polycondensation of the dicarboxylic acid or its reactive derivative such as an ester or an acid chloride and the glycol in the presence of a catalyst, or a modified ether type polyester resin prepared by depolymerizing and recondensing polyethylene terephthalate and the glycol to replace a part of the ethylene glycol units of the polyethylene terephthalate by the other glycol units.

The epoxy group-containing ethylene copolymer which is another component of the sublayer (a) is a copolymer of ethylene with an epoxy group-containing monomer which is copolymerizable with ethylene, and has the ethylene units and the epoxy groups. One preferred example of the epoxy group-containing ethylene copolymer is a copolymer comprising 20 to 99.9 wt. % of the ethylene units, 0.1 to 30 wt. % of the unsaturated carboxylic acid glycidyl ester units, or the unsaturated glycidyl ether, and 0 to 50 wt. % of the ethylenically unsaturated ester units other than the units of the unsaturated carboxylic acid glycidyl ester.

The unsaturated carboxylic acid glycidyl ester or the unsaturated glycidyl ether may be a compound represented by the formula (I):

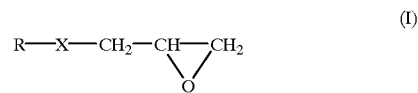

wherein R is a $C_2$–$C_{18}$ alkenyl group, and X is a carbonyloxy group, a methyleneoxy group or a phenyleneoxy group.

Examples of the compound of the formula (I) are glycidyl acrylate, glycidyl methacrylate, glycidyl itaconate, allyl glycidyl ether, methallyl glycidyl ether, styrene-p-glycidyl ether, and so on.

One or both of the unsaturated carboxylic acid glycidyl ester unit and the unsaturated glycidyl ether unit may be contained in the epoxy group-containing ethylene copolymer. The epoxy group-containing ethylene copolymer contains usually 0.1 to 30 wt. %, preferably 0.5 to 20 wt. % of these units in total.

The ethylenically unsaturated ester other than the unsaturated carboxylic acid glycidyl ester is an ester having a carbon—carbon double bond which is other than the unsaturated carboxylic acid glycidyl ester. Examples of such ethylenically unsaturated ester are vinyl esters of carboxylic acids such as vinyl acetate, vinyl propionate, etc.; esters of α,β-unsaturated carboxylic acids such as methyl acrylate, ethyl acrylate, butyl acrylate, methyl methacrylate, ethyl methacrylate, butyl methacrylate, etc.; and so on. Among them, vinyl acetate, methyl acrylate and ethyl acrylate are preferred. The ethylenically unsaturated ester units may be contained in the epoxy group-containing ethylene copolymer in an amount of not more than 50%, while they may not be contained in the copolymer.

In general, the epoxy group-containing ethylene copolymer has a melt flow rate (190) (hereinafter referred to as "MFR(190)") of about 0.1 to 300 g/10 min., which is measured according to JIS K6730 at 190° C. under a load of 2.16 kgf. Preferably, MFR(190) of the epoxy group-containing ethylene copolymer is from 0.5 to 80 g/10 min.

The epoxy group-containing ethylene copolymers may be used independently or in combination of two or more of them.

The epoxy group-containing ethylene copolymer may be prepared by a per se conventional method such as high pressure radical polymerization, solution polymerization, emulsion polymerization and so on.

In general, the ethylene copolymer, which is optionally contained in the sublayer (a), comprises 50 to 99.9 wt. % of the ethylene units and 0.1 to 50 wt. % of the ethylenically unsaturated ester units other than the unsaturated carboxylic acid glycidyl ester. The ethylenically unsaturated ester other than the unsaturated carboxylic acid glycidyl ester is an ester having a carbon—carbon double bond which is other than the unsaturated carboxylic acid glycidyl ester. Examples of such ethylenically unsaturated ester are vinyl esters of carboxylic acids such as vinyl acetate, vinyl propionate, etc.; esters of α,β-unsaturated carboxylic acids such as methyl acrylate, ethyl acrylate, butyl, acrylate, methyl methacrylate, ethyl methacrylate, butyl methacrylate, etc.; and so on. Among them, vinyl acetate, methyl acrylate and ethyl acrylate are preferred. The ethylene copolymer usually has MFR(190) of 0.1 to 300 g/10 min., preferably 0.6 to 80 g/10 min. The ethylene copolymers may be used independently or in combination of two or more of them The ethylene copolymer may be prepared by a per se conventional method such as high pressure radical polymerization, solution polymerization, emulsion polymerization and so on.

The sublayer (a) comprises the polyester resin, the epoxy group-containing ethylene copolymer and optionally the ethylene copolymer. The content of the polyester resin is from 30 to 90 wt. %, preferably from 40 to 80 wt. % of the whole weight of the polyester resin, the epoxy group-containing ethylene copolymer and the optional ethylene copolymer. A total amount of the epoxy group-containing ethylene copolymer and the optional ethylene polymer is from 70 to 10 wt. %, preferably from 60 to 20 wt. % of the whole weight of the polyester resin, the epoxy group-containing ethylene copolymer and the optional ethylene copolymer. A percentage of the epoxy group-containing ethylene copolymer in the total amount of the epoxy group-containing ethylene copolymer and the ethylene copolymer is from 3 to 100 wt. %, preferably from 10 to 100 wt %.

The total amount of the polyester resin, the epoxy group-containing ethylene copolymer and the optional ethylene copolymer is at least 80 wt %, preferably at least 90 wt. % of the whole sublayer (a).

In addition, the sublayer (a) may optionally contain one or more conventional additives, for example, a water-repellent such as an epoxy resin; a heat-resistant stabilizer such as a phenol type stabilizer, a sulfide type stabilizer, a phosphite type stabilizer, an amine type stabilizer and an amide type stabilizer; an anti-aging agent; a weathering stabilizer; an antistatic agent; and so on.

The second sublayer (b) of the layer (A) comprises at least one copolymer selected from the group consisting of the ethylene copolymer and the epoxy group-containing copolymer, and optionally the polyolefin.

Examples of the ethylene copolymer and the epoxy group-containing copolymer are the same as those exemplified in connection with the sublayer (a), but they may be selected independently from those used in the sublayer (a).

The ethylene copolymers or the epoxy group-containing copolymers may be used independently or in combination of two or more of them.

Examples of the polyolefin are polyethylene, polypropylene, polybutene-1, poly(4-methylpentene), and so on.

Usually, the polyolefin has MFR(190) of 0.1 to 300 g/10 min., preferably 0.5 to 80 g/10 min.

The polyolefins may be used independently or in combination of two or more of them.

When both the ethylene copolymer and the epoxy group-containing copolymer are contained in the sublayer (b), their ratio is not limited. A content of the polyolefin in the sublayer (b) is 50 wt. % or less.

In addition, the sublayer (b) may optionally contain one or more conventional additives, for example, a heat-resistant stabilizer such as a phenol type stabilizer, a sulfide type stabilizer, a phosphate type stabilizer, an amine type stabilizer and an amide type stabilizer; an anti-aging agent; a weathering stabilizer; an antistatic agent; and so on.

The adhesive layer (A) in the multi-layer molded article of the present invention may be derived from a film or sheet for the adhesive layer to be used in the production method of the multi-layer molded article. The film or sheet for the adhesive layer may be prepared by melting and kneading the respective components of the sublayers (a) and (b) using a single-screw or twin-screw extruder, a Banbury mixer, a heated roll, etc., molding each of the two melt mixture by a blown-film extrusion method, a T-die extrusion method, and the like to obtain each film or sheet, and laminating and molding two film or sheets for the sublayers (a) and (b). Alternatively, a laminate of the films or sheets for the sublayers (a) and (b) can be obtained directly by co-extruding the two melt mixtures using a die having two resin conduits and two extruders in combination.

The adhesive layer (A) has a thickness of 10 to 1000 $\mu$m, preferably 10 to 500 $\mu$m. A ratio of the thickness of the sublayer (a) to that of the sublayer (b) is from 1:10 to 100:1, preferably from 1:10 to 10:1.

Next, the adhesive layer (B) will be explained.

The adhesive layer (B) is obtained from the ethylene resin composition comprising 100 wt. parts of an epoxy-group containing copolymer (c) which comprises 20 to 99.9 wt. % of the ethylene units, 0.1 to 30 wt. % of the unsaturated carboxylic acid glycidyl ester units or the unsaturated glycidyl ether units, and 0 to 50 wt. % of the ethylenically unsaturated ester units other than the unsaturated carboxylic acid glycidyl ester units, 0.1 to 50 wt. parts of the polybasic carboxylic acid having at least two carboxyl groups, and optionally 0.1 to 20 wt. parts of the heat decomposable blowing agent. When the ethylene resin composition contains the blowing agent, it is an expandable composition.

The unsaturated carboxylic acid glycidyl ester or the unsaturated glycidyl ether is a compound of the above formula (I). Examples of this compound (I) are glycidyl acrylate, glycidyl methacrylate, glycidyl itaconate, allyl glycidyl ether, methallyl glycidyl ether, styrene-p-glycidyl ether, and so on.

One or both of the unsaturated carboxylic acid glycidyl ester unit and the unsaturated glycidyl ether unit may be contained in the epoxy group-containing ethylene copolymer. The epoxy group-containing ethylene copolymer contains usually 0.1 to 30 wt. %, preferably 0.5 to 20 wt. % of these units in total.

The ethylenically unsaturated ester other than the unsaturated carboxylic acid glycidyl ester in the copolymer (c) is an ester having a carbon—carbon double bond which is other than the unsaturated carboxylic acid glycidyl ester. Examples of such ethylenically unsaturated ester are vinyl esters of carboxylic acids such as vinyl acetate, vinyl propionate, etc.; esters of $\alpha,\beta$-unsaturated carboxylic acids such as methyl acrylate, ethyl acrylate, butyl acrylate, methyl methacrylate, ethyl methacrylate, butyl methacrylate, etc.; and so on. Among them, vinyl acetate, methyl acrylate and ethyl acrylate are preferred. The ethylenically unsaturated ester units may be contained in the epoxy group-containing ethylene copolymer in an amount of not more than 50%, while they may not be contained in the copolymer. When the amount of the ethylenically unsaturated ester units is more than 50 wt. %, the heat resistance of the adhesive layer decreases, and the powder flowability of the resin composition comprising the epoxy group-containing ethylene copolymer (c), the polybasic carboxylic acid, and optionally the blowing agent becomes insufficient so that it will be difficult to powder mold the composition to form the adhesive layer.

The epoxy group-containing ethylene copolymer (c) may be prepared by polymerizing the raw material monomers in the presence of a radical polymerization initiator in the presence or absence of a solvent, a chain transfer agent, etc. under pressure of 500 lo 4000 atm. at a temperature of 100 to 300° C. Alternatively, the copolymer (c) may be prepared by melt graft polymerizing a mixture containing polyethylene, an unsaturated compound having an glycidyl group, a radical polymerization initiator, etc. in an extruder.

Usually, the epoxy group-containing ethylene copolymer (c) has MFR(190) of at least 1 g/10 min., preferably at-least 5 g/10 min.

The epoxy group-containing ethylene copolymers may be used independently or in combination of two or more of them.

Examples of the polybasic carboxylic acid having at least two carboxyl groups are dicarboxylic acids such as maleic acid, malonic acid, phthalic acid, fumaric acid, succinic acid, 2,3-dimethylsuccinic acid, 2-ethyl-2-methylsuccinic acid, 2-phenylsuccinic acid, 2-hydroxysuccinic acid, glutaric acid, 3-methylglutaric acid, 2,4-dimethylglutaric acid, 3,3-dimethylglutaric acid, adipic acid, 3-methyladipic acid, sebacic acid, 1,4cyclohexanedicarboxylic acid, terephthalic acid, isophthalic acid, 5-methylisophthalic acid, 5-methoxyisophthalic acid, 5-hydroxyisophthalic acid, etc.; tricarboxylic acids such as 1,3,6-benzenetricarboxylic acid, 1,2,4-benzenetricarboxylic acid, 1,2,3-propanetricarboxylic acid, 2-phenyl-1,2,3-propanetricarboxylic acid, 3-phenyl-1, 2,3-propanetricarboxylic acid, 2-hydroxy-1,2,3-propanetricarboxylic acid, 3-hydroxy-1,2,3-propanetricarboxylic acid, etc.; tetracarboxylic acids such as pyromellitic acid; an ethylene-acrylic acid copolymer; and so on. Among them, those having a first acid dissociation constant of $50 \times 10^{-5}$ or less in water (20° C.) such as succinic acid and terephthalic acid are preferred.

A molecular weight of the polybasic carboxylic acid is not limited. When no heat decomposable blowing agent is used, one having a molecular weight of 3000 or less, in particular, 1000 or less is preferably used. The polybasic carboxylic acid may be a solid one or a liquid one.

The carboxylic acids may be used independently or in combination of two or more of them.

An amount of the polybasic carboxylic acid is from 0.1 to 50 wt. parts, preferably from 0.1 to 20 wt. parts per 100 wt. parts of the epoxy group-containing ethylene copolymer (c). When the amount of the polybasic carboxylic acid is lass than 0.1 wt. part or more than 50 wt. parts, the adhesion between the vinyl chloride resin skin material layer and the adhesive layer and/or the adhesion of the propylene core and the adhesive layer tend to be insufficient.

The adhesive layer (B) may be a layer obtained either from an ethylene resin composition containing the epoxy group-containing ethylene copolymer (c) and the polybasic caboxylic acid, or from an expandable ethylene resin composition containing the epoxy group-containing ethylene copolymer (c), the polybasic carboxylic acid and the heat decomposable blowing agent.

Specific examples of the heat decomposable blowing agent are azo compounds such as azodicarbonamide, 2,2'-azoisobutyronitrile, diazodiaminobenzene, etc.; sultonylhydrazide compounds such as benzenesultonylhydrazide, benzene-1,3-sulfonylhydrazide, diphenylsulfone-3,3'-disulfonylhydrazide, diphenyloxide 4,4'-disulfonylhydrazide, 4,4'-oxybis (benzenesultonylhydrazide), p-toluenesultfonylhydrazide, etc.; nitroso compounds such as N,N'-dinitrosopentamethylenetetramine, N,N'-dinitroso-N,N'-dimethylterephthalamide, etc.; azide compounds such as terephthalic acid azide, p-tert-butylbenzoic acid azide, etc.; carbonates such as sodium hydrogen carbonate, ammonium hydrogen carbonate, ammonium carbonate, etc.; and so on.

In general, the blowing agent having a decomposition temperature which is higher than the melting point of the epoxy group-containing ethylene copolymer (c) by 20 to 150° C., preferably by 50 to 120° C. is used.

The blowing agents may be used independently or in combination of two or more of them.

The heat decomposable blowing agent is used in an amount of 0.1 to 20 wt. parts, preferably 2 to 10 wt. parts per 100 wt. parts of the epoxy group-containing ethylene copolymer (c).

If necessary, the ethylene resin composition or the expandable ethylene resin composition used for the formation of the layer (B) may contain one or more conventional additives, for example, a heat-resistant stabilizer such as a phenol type stabilizer, a sulfide type stabilizer, a phosphite type stabilizer, an amine type stabilizer and an amide type stabilizer; an anti-aging agent; a weathering stabilizer; an antistatic agent; a metal soap; a lubricant; a pigment; a blowing aid; a foam-inhibitor; a liquid coating agent; a mold release agent; and so on.

The ethylene resin composition or the expandable ethylene resin composition may be prepared in the form of a powder composition or a melt kneaded composition by compounding the above components by a conventional compounding apparatus such as an open roll, a blender, a Banbury mixer, a kneader, a high-speed mixer, and so on. The components are compounded at a temperature at which the epoxy group-containing ethylene copolymer and the polybasic carboxylic acid are not crosslinked. When the heat decomposable blowing agent is used, the components are compounded at a temperature at which the epoxy group-containing ethylene copolymer and the polybasic carboxylic acid are not crosslinked, and which is tower than the decomposition temperature of the blowing agent.

For instance, preparation of the powder composition, which contains the epoxy group-containing ethylene copolymer, the polybasic carboxylic acid and the heat decomposable blowing agent, and is suitable for the powder molding, will be explained.

As a compounding apparatus, a blender, a high-speed mixer, and so on are used. The compounding apparatus is preferably equipped with a cooling jacket to cool the content in the apparatus to prevent mutual adhesion of the powder particles from the shear-generated heat. Among the compounding apparatuses, an apparatus which can prevent the mutual adhesion of the particles by the application of a shear force, such as the high-speed mixer is preferably used.

In general, the preground epoxy group-containing ethylene copolymer is used. Its average particle size is 32 mesh (a size which passes a mesh heaving a size of 500 $\mu$m×500 $\mu$m) or less, preferably 40 mesh (a size which passes a mesh having a size of 355 $\mu$m×355 $\mu$m) to 100 mesh (a size which passes a mesh having a size of 150 $\mu$m×150 $\mu$m), when the Tyler standard sieve is used.

When the polybasic carboxylic acid is a solid one, its average particle size is generally 100 $\mu$m or less.

When the liquid polybasic carboxylic acid is used, in general, it is first mixed with the epoxy group-containing ethylene copolymer and, then, with the heat decomposable blowing agent.

The powder composition suitable for the powder molding may be prepared by kneading the epoxy group-containing ethylene copolymer, the polybasic carboxylic acid, the heat decomposable blowing agent, and other optional additives in an extruder, cooling the melt kneaded composition to the glass transition temperature of the copolymer or lower, and then grinding the composition. In this case, the particles in the powder composition have an average particle size of 32 mesh or less, preferably from 40 to 100 mesh, when the Tyler standard sieve is used.

The adhesive layer (B) in the multi-layer molded article of the present invention may be derived from a film or sheet for the adhesive layer to be used in the production method of the multi-layer molded article. The film or sheet may be formed from the above explained ethylene resin composition or the expandable ethylene resin composition by power molding, inflation molding, extrusion, and so on.

A molding temperature of the ethylene resin composition is usually from 80 to 250° C., preferably from 100 to 200° C., and a molding temperature of the expandable ethylene resin composition is usually from 120 to 280° C., preferably from 150 to 250° C.

The adhesive layer (B) may be formed in the form of a laminate of the skin material and the adhesive layer which is laminated on the skin material by powder slush molding the powder composition of the adhesive layer (B) after the vinyl chloride resin skin material is powder slush molded. Hereinafter, the laminate consisting of the skin material and the adhesive layer (B) is referred to as a "composite layer". The composite layer may be prepared by the continuous powder slush molding of the skin material and the adhesive layer, or adhering the skin material and the film or sheet for the adhesive layer.

A thickness of the adhesive layer (B) is usually from 10 to 1000 μm, preferably from 10 to 500 μm in the case of the non-foam layer, or usually from 0.5 to 5 mm, preferably from 1 to 3 mm in the case of the foam layer.

Now, the vinyl chloride resin skin material is explained.

The vinyl chloride resin is a polymer comprising vinyl chloride units as repeating units. Examples of the vinyl chloride resin are a homopolymer of vinyl chloride, and copolymers of vinyl chloride and at least one other monomer copolymerizable therewith, such as a vinyl chloride-vinyl acetate copolymer, a vinyl chloride-ethylene copolymer, a vinyl chloride-propylene copolymer, a vinyl chloride-isobutyrene copolymer, a vinyl chloride-styrene copolymer, a vinyl chloride-vinylidene chloride copolymer, a vinyl chloride-butadiene copolymer, a vinyl chloride-acrylate copolymer, a vinyl chloride-maleate copolymer, a vinyl chloride-methacrylate copolymer, a vinyl chloride-acrylonitrile copolymer, a vinyl chloride-styrene-maleic anhydride terpolymer, a vinyl chloride-vinylidene chloride-vinyl acetate terpolymer, a vinyl chloride-styrene-acrylonitrile terpolymer, a graft copolymer of vinyl chloride grafted on an ethylene-vinyl acetate copolymer, and the like. The vinyl chloride resins may be used independently or in combination of two or more of them.

The vinyl chloride resin skin material may consist of a non-foam layer alone, or a laminate of a non-form layer as a surface layer, and a foam layer as a backing layer.

Such skin material may be produced by a per se conventional method. The skin material is preferably produced by powder molding of a powder composition containing the vinyl chloride resin, since a minute uneven decoration such as leather grain and stitch can be formed on the surface of the non-foam surface layer. The powder molding method includes a fluidized dip method, a powder sintering method, an electrostatic powder coating method, a powder spray coating method, a rotational powder molding method and a powder slush molding method (see Japanese Patent KOKAI Publication No. 132057/1983). Among them, the powder slush molding method is preferred.

The production method of the vinyl chloride resin skin material will be explained by making reference to the powder slush method.

In general, the powder composition to be used can contain conventional additives such as a plasticizer, a stabilizer, a pigment, etc.

In general, the powder composition for the non-foam layer is prepared by dry blending the granular vinyl chloride resin with a plasticizer, a stabilizer, a pigment, and so on, and then compounding the fine particle vinyl chloride resin. A temperature of the components in the dry blending step is usually from 60 to 130° C., and that in the compounding step is usually from 40 to 80° C.

The granular vinyl chloride resin means one having a particle size of 100 to 150μm, and is usually prepared by suspension polymerization or bulk polymerization. The fine particle vinyl chloride resin is used to coat the surfaces of the granular vinyl chloride resin particles. As the fine particle vinyl chloride resin, the vinyl chloride homopolymer, the vinyl chloride-ethylene copolymer, the vinyl chloride-propylene copolymer, the vinyl chloridevinyl acetate and so on are preferably used. The fine particle vinyl chloride resin has a particle size of 0.1 to 10 μm, and is prepared by emulsion polymerization or microemulsion polymerization.

As the plasticizer, any plasticizer which can be used in the powder molding method may be used. Examples of the plasticizer are dialkyl phthalates having 9 to 12 carbon atoms in the alkyl group such as diIsodecyl phthalate, diisoundecyl phthalate, etc.: trialkyl trimellitates having 7 to 11 carbon atoms in the alkyl group such as tri-2-ethylhexyl trimellitate, tridecyl trimellitate, etc.; and the like. An amount of the plasticizer is usually from 40 to 120 wt. parts per 100 wt. parts of the vinyl chloride resin.

Examples of the stabilizer are salts of carboxylic acids with metals such as zinc, vanadium, sodium, potassium, calcium, lithium, tin, etc., magnesium oxide, magnesium hydroxide, hydrotalcite, zinc oxide, barium oxide, calcium oxide, barium phosphate, phenol base antioxidants, thioether base antioxidants, phosphorus base antioxidants, diketo compound base light stabilizers, salicylic acid base light stabilizers, benzophenone base light stabilizers, benzotriazole base light stabilizers, epoxy compounds, and so on. They may be used independently or in combination of two or more of them. Among them, a composite stabilizer containing two or more metal salts of the carboxylic acids is preferably used. An amount of the stabilizer is usually from 3 to 15 wt. parts per 100 wt. parts of the vinyl chloride resin.

A powder composition for the foam layer used as the backing layer in the vinyl chloride resin skin material may be prepared by the same way as the preparation of the powder composition for the non-foam layer except that a blowing agent, and if necessary, a blowing aid, a cell regulator, etc. are compounded in the step of dry blending the granular vinyl chloride resin, the plasticizer, the stabilizer, and the pigment.

Examples of the blowing agent are heat decomposable blowing agents such as azodicarbonamide, benzenesullonylhydrazides (e.g. p,p'-oxybisbenzenesulfonylhydrazide, p-toluene-sulfonylhydrazide, benzenesulfonylhydrazide, etc.) and so on. They may be used independently or in combination of two or more of them. Among them, azodicarbonamide is preferably used. An amount of the blowing agent is usually from 1 lo 10 wt. parts per 100 wt. parts of the vinyl chloride resin.

The vinyl chloride resin skin material consisting of the non-foam layer may be prepared by the powder slush molding method as follows:

An opening of a container which contains the powder composition for the non-foam layer is closely mated with an opening of a mold which has a minute uneven decoration on its inner wall and has been heated to a temperature well higher than the melting temperature of the powder composition, for example, 160 to 300° C. The integrated container and the mold are rotated and/or rocked to adhere the powder composition to the molding surface of the mold.

Then, the container and the mold are stopped in a position that the mold is in the upper side while the container is in the lower side to return the unadhered components into the container. By the above method, the skin material consisting of the non-foam layer is formed.

The vinyl chloride resin skin material consisting of the non-foam layer and the foam layer may be prepared by the powder slush method as follows;

First, an opening of a container which contains the powder composition for the non-foam layer is closely mated with an opening of a mold which has a minute uneven decoration on its inner wall. The integrated container and mold are rotated and/or rocked to adhere the powder composition to the molding surface of the mold. Then, the container and the mold are stopped in a position that the mold is in the upper side while the container is in the lower side to return the unadhered components into the container. The container containing the unadhered components is removed from the mold, and then other container which contains the powder composition for the foam layer is closely mated with the opening of the mold which has been heated to a temperature well higher than the melting point of the powder composition for the foam layer, for example 160 to 300° C. The integrated container and mold are rotated and/or rocked to adhere the powder composition to the non-form layer on the molding surface of the mold. Then, another container and the mold are stopped in a position that the mold is in the upper side while another container is in the lower side to return the unadhered components of the powder composition for the foam layer into the container. Thereafter the other container is removed from the mold. When the mold is heated to a temperature higher than the decomposition temperature of the blowing agent in the powder composition for the foam layer, for example, 180 to 280° C., to blow the molten powder composition for the foam layer. By the above steps, the skin material consisting of the non-foam layer and the foam layer is produced.

A heating method employed in the powder slush method is not limited, and selected from, for example, a gas heating furnace method, an electric heating furnace method, a heat transfer medium-circulation method, a dipping method in a heat transfer medium oil or a heated fluidized sand, a radio frequency induction heating method, and so on. Such heating method may be used for blowing the molten powder composition for the foam layer.

Hereinafter, the propylene resin core material will be explained.

Examples of the propylene resin are a homopolymer of propylene, a propylene-ethylene block copolymer, a propylene-butene random copolymer, an ethylene-propylene-butene terpolymer, and so on. Usually, the propylene resin has MFR(190) of 0.1 to 300 g/10 min., preferably 1 to 200 g/10 min. it desired, the propylene resin may contain an additive such as a filler (e.g. an inorganic filler, a glass fiber, etc.), a pigment, a lubricant, an antistatic agent, a stabilizer, and so on.

The multi-layer molded article of the present invention may be produced as follows:

The vinyl chloride resin skin material, the film or sheet for the adhesive layer and the propylene resin which has been preheated to a temperature higher than its melting point (e.g. a melt of the propylene resin) are laminated in this order, and pressed to adhere the vinyl chloride resin skin material and the propylene resin through the adhesive layer to form a multi-layer molded article. When the film or sheet for the adhesive layer has two sublayers (a) and (b), the sheet or film is laminated so that the sublayer (a) Races the skin material.

The multi-layer molded article of the present invention can be produced by laminating the composite layer of the vinyl chloride resin skin material and the adhesive layer which are integrally laminated, and the propylene resin which has been preheated to a temperature higher than its melting point and pressing them. In this case, they are laminated so that the adhesive layer of the composite layer faces the propylene resin.

The above production method will be explained more concretely.

The vinyl chloride skin material is supplied between the molding surfaces of male and female molds for compression molding. Then, the film or sheet for the adhesive layer is supplied between the skin material and the molding surface of one of the male and female molds (the first mold). When the skin material consists of the non-foam layer and the foam layer, in general, the adhesive layer is supplied between the skin material and the molding surface of the mold which is present on a side of the foam layer of the skin material. When the film or sheet for the adhesive layer consists of the two layers for the sublayers (a) and (b), it is supplied so that the layer for the sublayer (a) faces the vinyl chloride skin material. Then, a melt of the propylene resin for the core is supplied between the film or sheet for the adhesive layer and the molding surface of the first mold, and the male and female molds are closed to integrate the skin material, the film or sheet for the adhesive layer, and the propylene resin melt to form the multi-layer molded article.

In the above method, when the skin material which has been produced by the powder molding method is used, it may be possible to insert the mold for powder molding which has been used in the molding of the skin material and carries the skin material on its molding surface, in a mold base of one of the male and female molds for compression molding, and used in the compression molding, whereby the mold for powder molding can be used in the production of the multi-layer molded article. In this case, the multi-layer molded article having no damage on the uneven decoloration of the skin material is obtained.

Alternatively, the multi-layer molded article can be produced by supplying the composite layer consisting of the vinyl chloride resin skin material and the adhesive layer which are integrally laminated between the molding surfaces of the male and female molds, supplying the propylene resin melt between the composite layer and the molding surface of the mold which is present on a side of the adhesive layer of the composite layer, and closing the male and female molds to adhere the composite layer and the propylene resin melt. Also in this case, when the composite layer which is prepared by the powder slush molding, the mold for powder molding the composite layer which carries the composite layer thereon can be inserted in the mold base and used in the compression molding of the multi-layer molded article, whereby the same effect as described above is achieved.

The propylene resin melt for the core is preferably supplied while the molds are in the unclosed state. That is, preferably, the molds are closed during or after the supply of the propylene resin melt. The "molds being in the unclosed state" means that a clearance between the molding surfaces of the male and female molds is more than the thickness of the final product. When the propylene resin melt is supplied in the above manner, the position of the skin material is less shifted than when the resin melt is supplied in the cavity of the closed molds, so that the multi-layer molded article having a good surface with uneven decoloration is obtained.

A method for supplying the propylene resin melt is not limited. For example, the propylene resin melt is supplied between the back face of the skin material and one of the mold which faces the back face of the skin material from openings in the molding surface of the mold through resin conduits which are provided in the mold. Alternatively, a resin supply nozzle is inserted in the cavity between the molding surfaces of the male and female molds, and the propylene resin melt is supplied in the mold through the nozzle. In this case, the nozzle is removed from the mold cavity before the mold closing is started.

A closing direction of the male and female molds for compression molding may be in a vertical direction or a horizontal direction. When a pair of male and female molds which are closed or opened in a manner that an outer peripheral surface of one of them and an inner peripheral wall of the other of them move with closely lacing each other are used, a clearance between the outer periphery and the inner peripheral wall is preferably substantially the same as the thickness of the skin material, whereby a molded article having a marginal part of the skin material at edges of the article can be obtained. When the marginal part of the skin material is folded back and adhered to the back face of the article, the article all the peripheries of which are covered by the skin material is obtained.

The multi-layer molded article of the present invention comprises the vinyl chloride resin skin material and the propylene resin core which are firmly bonded by the adhesive layer, so that the skin material is not or hardly peeled off from the core. Since the core comprises the propylene resin, the article has a light weight advantageously. The multi-layer molded article of the present invention finds various applications as follows.

In the automobile industries, it can be used as an interior part such as an instrument panel, a console box, an arm rest, a head rest, a door trim, a rear end panel, a pillar trim, a sun visor, a trunk room trim, a trunk lid trim, a box for containing an air bag, a sheet belt buckle, a head liner, a glove box, a steering wheel cover, a ceiling material, a kicking plate, a shift lever boot, etc., or an exterior part such as a spoiler, a body side ornament, a license plate housing, a mirror housing, an air dam skirt a mad guard, etc.

In the appliance and office automation equipment field, the multi-layer molded article of the present invention can be used as an exterior part of a TV set, a cassette tape recorder, a washing machine, a vacuum cleaner, an air conditioner, etc.

In the sports good field, it can be used as an interior material of a boat or a ship.

In the construction and housing field, it can be used as a furniture, a desk, a chair, a gate, a door, a fence, a wall decoration, a ceiling decoration, an indoor flooring such as a flooring of a kitchen, a wash room and a bath room, etc.

Further, the multi-layer molded article of the present invention may be used as a part of an industrial material or a miscellaneous good.

EXAMPLES

The present invention will be illustrated by the following Examples, which will not limit the scope of the present invention in any way.

Example 1

1) Preparation of a powder composition for a surface (non-foam) layer of a skin material In a high speed mixer (Super Mixer SMV-20 manufactured by Kawata Manufacturing Co., Ltd.), granular vinyl chloride resin (SUMILIT Sx-8G manufactured by Sumitomo Chemical Co., Ltd. Average particle size=140 $\mu$m) (90 wt. parts) was charged and heated while agitating it at a constant rate. When the temperature reached 80° C., a trimellitate type plasticizer (60 wt. parts), a barium-zinc base stabilizer (3 wt. parts) and a pigment (1 wt. part) were added and dry blended.

When the temperature of the mixture reached 120° C., the mixture was cooled, and at 50° C., fine particle vinyl chloride resin (SUMILIT Px-QLT manufactured by Sumitomo Chemical Co., Ltd. Average particle size=1 $\mu$m) (10 wt. parts) was added to the mixture and homogeneously dispersed to obtain a power composition for a surface layer of a skin material.

2) Preparation of a powder composition for a foam layer of a skin material

In the same manner as in the preparation of the powder composition for the non-foam layer except that azodicarbonamide (AZL-30 manufactured by Otsuka Chemical Co., Ltd. Decomposition temperature: 199° C.) (1.5 wt. parts), zinc white as a blowing aid (1 wt. part) and an acrylic cell regulator (1 wt. part) were added to the mixture during dry blending, a powder composition for a foam layer of a skin material is obtained.

3) Production of a skin material

On a molding surface of a nickel made mold which had been heated to 240° C., the above obtained powder composition for the surface (non-foam) layer was supplied and maintained for 8 seconds. Immediately thereafter, excessive powder was discharged. Alter 10 seconds, the powder composition for the foam layer was supplied on the layer of the powder composition for the surface layer, and maintained for 18 seconds. Immediately thereafter, the excessive powder was discharged.

Then, the mold carrying the layers of the powder compositions was placed in an oven kept at 240° C. and heated for 90 seconds. Thereafter, the mold was taken out from the oven and cooled, and a skin material consisting of a non-foam layer of 0.7 mm in thickness and a foam layer of 2 mm in thickness was removed from the mold.

4) Production of a two-layer adhesive film

A polyester resin (VILON GM900 manufactured by Toyobo), a ethylene-glycidyl methacrylate-vinyl acetate (copolymer) containing 83 wt. % of ethylene units, 12 wt. % of glycidyl methacrylate units and 5wt. % of vinyl acetate units and having MFR(190) of 7 g/10 min. (BONDFAST 7B manufactured by Sumitomo Chemical Co., Ltd.), an ethylene-vinyl acetate copolymer containing 10 wt. % of vinyl acetate units and having MFR(190) of 6 g/10 min., and an epoxy resin (SUMIEPOXY ESCN-220) in a weight ratio of 60:10:25:5 were mixed and kneaded to obtain a composition for the sublayer (a).

Then, the composition for the sublayer (a) and BOND-FAST 7B for the sublayer (b) were coextruded by a coextruder to obtain a two-layer adhesive film of the sublayers (a) and (b) each having a thickness of 25 $\mu$m.

5) Production of a multi-layer molded article

On an aluminum plate, the above produced skin material was placed with contacting the non-foam layer to the aluminum plate. Over the skin material, the two-layer adhesive film was placed with contacting the sublayer (a) to the skin material. Then, over the adhesive layer, a polypropylene sheet (a block polypropylene containing 15 wt. % of talc. MFR(190)=40 g/10 min.) having a thickness of 3 mm which had been heated in an oven at 220° C. for 5 minutes was placed. On the polypropylene sheet, other aluminum plate was placed. Thereafter, a load of 25 g/cm² was applied on the other aluminum plate for 5 minutes and then removed to obtain a multi-layer molded article.

After the molded article was kept standing for one day, it was cut to a strip having a width of 20 mm, and subjected to a 180 degree peel test at 20° C. at a peeling rate of 200 mm/min. The result is shown in Table 1.

Example 2

In the same manner as in Example 1 except that an ethylene-vinyl acetate copolymer containing 25 wt. % of vinyl acetate units and having MFR(190) of 3 g/10 min. was used in place of BONDFAST 7B for the sublayer (b) of the adhesive layer, a multi-layer molded article was produced, and subjected to the peel test. The result is shown in Table 1.

Example 3

In the same manner as in Example 1 except that an ethylene-vinyl acetate copolymer containing 10 wt. % of vinyl acetate units and having MFR(190) of 6 g/10 min. was used in place of BONDFAST 7B for the sublayer (b) of the adhesive layer, a multi-layer molded article was produced, and subjected to the peel test. The result is shown in Table 1.

Example 4

In the same manner as in Example 1 except that an ethylene-glycidyl methacrylate-vinyl acetate copolymer containing 83 wt. % of ethylene units, 12 wt. % of glycidyl methacrylate units and 5 wt. % of vinyl acetate units and having MFR(190) of 3 g/10 min. was used in place of BONDFAST 7B for the sublayer (b) of the adhesive layer, a multi-layer molded article was produced, and subjected to the peel test. The result is shown in Table 1.

Example 5

In the same manner as in Example 1 except that an ethylene-vinyl acetate copolymer containing 25 wt. % of vinyl acetate and having MFR(190) of 3 g/10 min. was used in place of the ethylene-vinyl acetate copolymer containing 10 wt. % of vinyl acetate and having MFR(190) of 6 g/10 min. in the composition for the sublayer (a) of the adhesive layer, a multi-layer molded article was produced, and subjected to the peel test. The result is shown in Table 1.

Comparative Example 1

In the same manner as in Example 1 except that no adhesive layer was used, a multi-layer molded article was produced, and subjected to the peel test. The result is shown in Table 1.

Comparative Example 2

In the same manner as in Example 1 except that a powder composition consisting of 100 wt. parts of the powder composition for the foam layer obtained in Example 1 and 48 wt. parts of a polyoletin thermoplastic elastomer which was obtained by freeze grinding SUMITOMO TPE 3681 (manufactured by Sumitomo Chemical Co., Ltd.) was used as a powder composition for the foam layer of the skin material, and no adhesive layer was used, a multi-layer molded article was produced, and subjected to the peel test. The result is shown in Table 1.

TABLE 1

| Example No. | Peel strength (gf/20 mm) |
| --- | --- |
| Example 1 | 4500 |
| Example 2 | 3100 |
| Example 3 | 2900 |
| Example 4 | 4700 |
| Example 5 | 2800 |
| Comp. Ex. 1 | 90 |
| Comp. Ex. 2 | 320 |

Example 6

As shown in FIG. 1, a powder composition 3 for a skin layer which was obtained in the same manner as in Example 1 was charged in a container 1. An opening of a mold 2 for powder molding which has a leather grain decoration and had been heated to 240° C. was mated with an opening of the container as shown in FIG. 1. Around the mated openings, a frame was fixed to integrate the container 1 and the mold 2.

Then, the integrated container 1 and mold 2 were rotated for 7 seconds using an uniaxial rotator to supply the powder composition 3 into the mold 2 to adhere the powder composition to the molding surface having the leather grain decoration. After stopping the rotation, the excessive powder composition was recovered in the container 1.

The container 1 was detached from the mold 2. Then, other container 1 containing the powder composition for the foam layer which was obtained in the same manner as in Example 1 was attached to the mold 1 to integrate them together. Again, the integrated other container 1 and mold 2 were rotated for 15 seconds using the uniaxial rotator to adhere the powder composition for the foam layer onto the molten layer of the powder composition 3 on the molding surface of the mold 3. After stopping the rotation, the excessive powder composition was recovered in the container 1.

Figure 2:
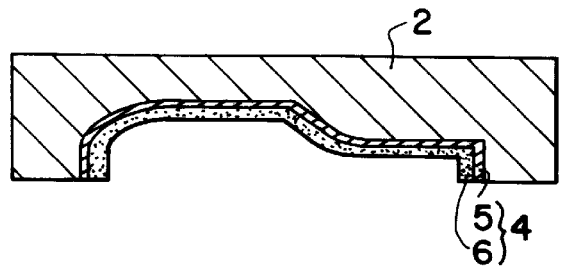
FIG. 2 is a cross sectional view of a mold for powder molding which carries, on its inner surface, a skin material.

Then, the other container 1 was detached from the mold 2, and the mold 2 was heated in an oven at 240° C. for one minute to shape the foam layer. The mold 2 was removed from the oven and cooled to obtain a skin material 4 consisting of the surface layer 5 and the foam layer 6 as shown in FIG. 2.

Figure 3:
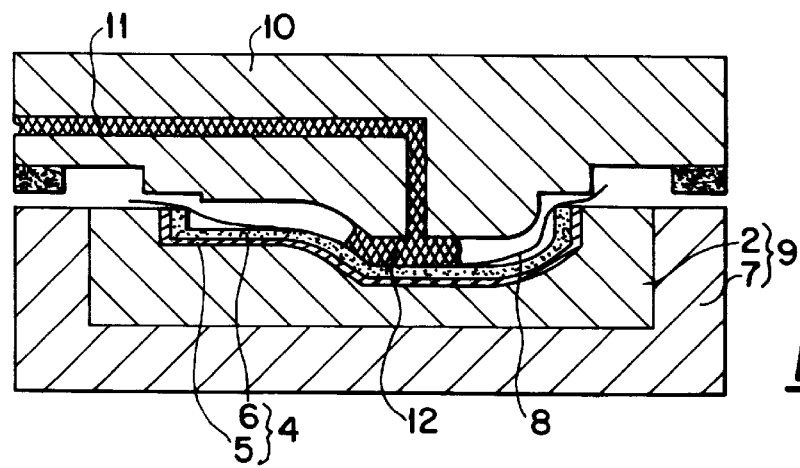
FIG. 3 is a cross sectional view of a mold in which a mold for powder molding the skin material which carries the skin material is integrated with a mold base, then a two-layer film as an adhesive layer is placed, and a melt of a propylene resin is supplied in a mold cavity through a resin conduit provided in a male mold.

As shown in FIG. 3, the mold 2 for powder molding which carried the skin material 4 was inserted in a mold base 7 to set up a female mold 9.

Thereafter, as shown in FIG. 3, a two-layer adhesive film 8 which was produced in the same manner as in Example 1 was placed on the skin material 4 with the sublayer (a) facing the skin material 4. While the female mold 9 and a male mold were in the unclosed state, a propylene resin melt 12 was supplied between the two-layer adhesive film 8 and the male mold 10 through a resin conduit 11.

As the propylene resin melt, a polypropylene resin (SUMITOMO NOBLEN AX 568 manufactured by Sumitomo Chemical Co., Ltd. MFR(190)=65 g/10 min.), which was heated to 190° C., was used.

Figure 4:
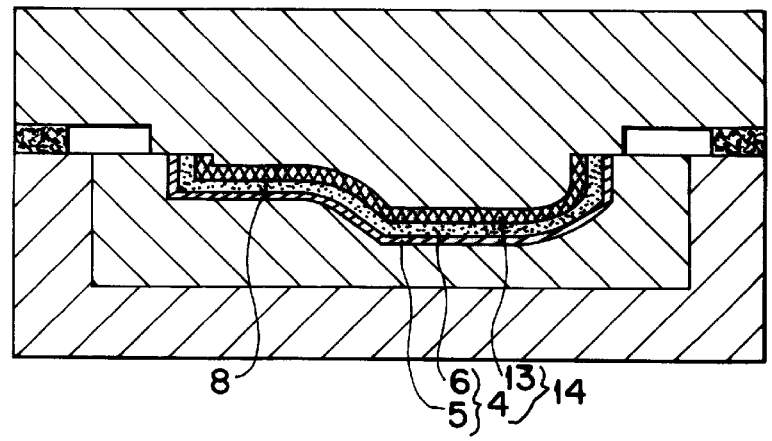
FIG. 4 shows a state of the mold after male and female molds are closed and the shaping of the multi-layer molded article is finished.

Then, the molds were closed under a pressure of 50 kg/cm² on the molding surface to finish the molding of the propylene resin melt 12. Thereby, as shown in FIG. 4, a multi-layer molded article 14 consisting of the skin material 4 and the propylene resin core 13 which were integrated together was obtained.

Figure 5:
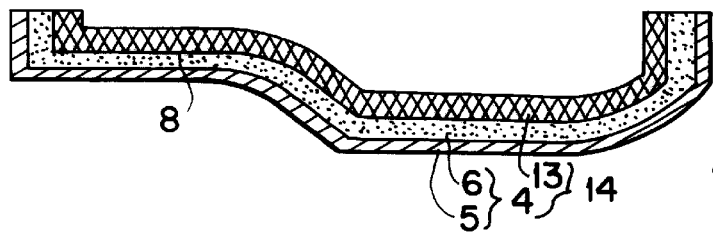
FIG. 5 is a cross sectional view of one example of the multi-layer molded article comprising the skin material layer, the adhesive layer and the core.

FIG. 5 shows a cross section of the obtained multi-layer molded article in the mold closing direction. The thicknesses of the non-foam layer and the foam layer of the skin material were 0.7 mm and 1.5 mm, respectively, and the thickness of the propylene resin core was 2 mm. On the surface layer, the leather grain was clearly transferred, and the multi-layer molded article had good appearance, When the peeling of the skin material from the article was tried, the skin material was not peeled off but was broken.

Reference Example 1

Preparation of a powder composition of a surface (non-foam) layer of a skin material In a high speed mixer (Super Mixer SMV-20 manufactured by Kawata Manufacturing Co., Ltd.), granular vinyl chloride resin (SUMILIT Sx-8G manufactured by Sumitomo Chemical Co., Ltd. Average particle size=140 μm) (90 wt. parts) was charged and heated while agitating it at a constant rate. When the temperature reached 80° C., a trimellitate type plasticizer (60 wt. parts), a barium-zinc base stabilizer (3 wt. parts) and a pigment (1 wt. part) were added and dry blended.

When the temperature of the mixture reached 12° C., the mixture was cooled to 50° C. Then, to the mixture, fine particle vinyl chloride resin (SUMILIT Px-QLT manufactured by Sumitomo Chemical Co., Ltd. Average particle size=1 μm) (10 wt. parts) was added and homogeneously dispersed to obtain a power composition of a surface layer of a skin material.

Reference Example 2

Preparation of a powder composition for a foam layer of a skin material

In the same manner as in the preparation of the powder composition for the non-foam layer except that azodicarbonamide (AZL-30 manufactured by Otsuka Chemical Co., Ltd. Decomposition temperature: 199° C.) (3 wt. parts) and zinc white (a blowing aid) (1 wt. part) were compounded in place of the pigment in the dry blending, a powder composition for a foam layer of a skin material was prepared.

Reference Example 3

Preparation of an ethylene base powder composition for an adhesive layer

In the Super Mixer, a powder of a ethylene-glycidyl methacrylate-vinyl acetate(copolymer) containing 83 wt. % of ethylene units, 12 wt. % of glycidyl methacrylate units and 5 wt. % of vinyl acetate units and having MFR(190) of 20 g/10 min. (BEONDFAST 20B manufactured by Sumnitomo Chemical Co., Ltd.) (100 wt. parts) and terephthalic acid (5 wt. parts) were charged and mixed to obtain a powder composition for an adhesive layer.

Reference Example 4

Preparation of an expandable powder composition for an adhesive layer

In the same manner as in Reference Example 3 except that azodicarbonamide having a decomposition temperature of 206° C. (CELLMIC C-121 manufactured by Sankyo Chemical Co., Ltd.) (5 wt. parts) was further added, an expandable powder composition for an adhesive layer was prepared.

Example 7

Production of a composite layer of a skin material and a non-foam adhesive layer On a molding surface of a nickel made mold which had been heated to 24° C., the powder composition for the surface layer of the skin material prepared in Reference Example 1 was powdered and maintained for 10 seconds. Immediately thereafter, the unadhered powder composition was discharged. After 10 seconds, the powder composition for the adhesive layer prepared in Reference Example 3 was powdered over the molten powder composition which was adhered to the molding surface of the mold and maintained for 3 seconds. Immediately thereafter, the unadhered powder composition was discharged.

Then, the mold carrying the two layers of the powder compositions was placed in an oven kept at 250° C. and heated for 120 seconds. Thereafter, the mold was taken cut from the oven and cooled, and a composite layer consisting of the skin material of 0.8 mm in thickness and the adhesive layer of 0.4 mm in thickness was removed from the mold.

Production of a multi-layer molded article

On an aluminum plate, the above produced composite layer was placed with contacting the skin material to the aluminum plate. Over the composite layer, a polypropylene sheet (a block polypropylene containing 15 wt. % of talc. MFR(190)=40 g/10 min.) having a thickness of 3 mm, which had been heated in an oven at 220° C. for 5 minutes, was placed. On the polypropylene sheet, other aluminum plate was placed. Thereafter, a load of 25 g/cm$^2$ was applied on the other aluminum plate and then removed to obtain a multi-layer molded article.

After the molded article was kept standing for one day, it was cut to a strip having a width of 20 mm, and subjected to a 180 degree peel test at 20° C. at a peeling rate of 200 mm/min. The result is shown in Table 2.

Example 8

In the same manner as in Example 7 except that a powder composition for an adhesive layer, which was prepared in the similar method to that of Reference Example 3 but using adipic acid (10 wt. parts) instead of terephthalic acid, was used in place of the powder composition for the adhesive layer prepared in Reference Example 3, a multi-layer molded article was produced. The result is shown in Table 2.

Example 9

In the same manner as in Example 7 except that a powder composition for an adhesive layer, which was prepared in the similar method to that of Reference Example 3 but using phthalic acid (3 wt. parts) instead of terephthalic acid, was used in place of the powder composition for the adhesive layer prepared in Reference Example 3, and the mold carrying the two layers of the powder compositions were heated in the oven for 60 seconds instead of 120 seconds, a multi-layer molded article was produced. The result is shown in Table 2.

Example 10

In the same manner as in Example 7 except that a powder composition for an adhesive layer, which was prepared in the similar method to that of Reference Example 3 but using isophthalic acid (5 wt. parts) instead of terephthalic acid, was used in place of the powder composition for the adhesive layer prepared in Reference Example 3, a multi-layer molded article was produced. The result is shown in Table 2.

Example 11

In the same manner as in Example 7 except that a powder composition for an adhesive layer, which was prepared in the similar method to that of Reference Example 3 but using polyacrylic acid having a weight average molecular weight of 2000 (5 wt. parts) instead of terephthalic acid, was used in place of the powder composition for the adhesive layer prepared in Reference Example 3, a multi-layer molded article was produced. The result is shown in Table 2.

Example 12

In the same manner as in Example 7 except that a powder composition for an adhesive layer, which was prepared in the similar method to that of Reference Example 3 but using 1,3,5-benzenetricarboxylic acid (5 wt. parts) instead of terephthalic acid, was used in place of the powder composition for the adhesive layer prepared in Reference Example 3, a multi-layer molded article was produced. The result is shown in Table 2.

Example 13

In the same manner as in Example 7 except that a powder composition for an adhesive layer, which was prepared in the similar method to that of Reference Example 3 but using a ethylene-glycidyl methacrylate-vinyl acetate(copolymer) containing 83 wt. % of ethylene units, 12 wt. % of glycidyl methacrylate units and 5 wt. % of vinyl acetate units and having MFR(190) of 90 g/10 min. (BONDFAST 70B-P manufactured by Sumitomo Chemical Co., Ltd.) instead of BONDFAST 20B, was used in place of the powder composition for the adhesive layer prepared in Reference Example 3, a multi-layer molded article was produced. The result is shown in Table 2.

Example 14

In the same manner as in Example 7 except that a powder composition for an adhesive layer, which was prepared in the similar method to that of Reference Example 3 but using a ethylene-glycidyl methacrylate-vinyl acetate(copolymer) containing 83 wt. % of ethylene units, 12 wt. % of glycidyl methacrylate units and 5 wt. % of vinyl acetate units and having MFR(190) of 7 g/10 min. (BONDFAST 7B manufactured by Sumitomo Chemical Co., Ltd.) instead of BONDFAST 20B, was used in place of the powder composition for the adhesive layer prepared in Reference Example 3, a multi-layer molded article was produced. The result is shown in Table 2.

Example 15

In the same manner as in Example 7 except that a powder composition for an adhesive layer, which was prepared in the similar method to that of Reference Example 3 but using a ethylene-glycidyl methacrylate(copolymer) containing 85 wt. % of ethylene units and 15 wt. % of glycidyl methacrylate units and having MFR(190) of 280 g/10 min. (manufactured by Sumitomo Chemical Co., Ltd.) instead of BONDFAST 20B, was used in place of the powder composition for the adhesive layer prepared in Reference Example 3, a multi-layer molded article was produced. The result is shown in Table 2.

Comparative Example 3

In the same manner as in Example 7 except that no powder composition for an adhesive layer was used, and the mold carrying only the layer of the powder material for the skin material was heated in the oven immediately after the excessive powder composition was discharged. A multi-layer molded article was produced. The result is shown in Table 2.

Comparative Example 4

In the same manner as in Example 7 except that a powder composition for an adhesive layer, which was prepared in the similar method to that of Reference Example 3 but using no terephthalic acid, was used in place of the powder composition for the adhesive layer prepared in Reference Example 3, a multi-layer molded article was produced. The result is shown in Table. 2.

TABLE 2

| Example No. | Peel strength (gf/20 mm) |
| --- | --- |
| Example 7 | 1300 |
| Example 8 | 630 |
| Example 9 | 830 |
| Example 10 | 1200 |
| Example 11 | 240 |
| Example 12 | 730 |
| Example 13 | 1060 |
| Example 14 | 530 |
| Example 15 | 1200 |
| Comp. Ex. 3 | 90 |
| Comp. Ex. 4 | 40 |

Example 16

Production of a composite layer of a skin material and a foam adhesive layer

On a molding surface of a nickel made mold which had been heated to 240° C., the powder composition for the surface layer of the skin material prepared in Reference Example 1 was powdered and maintained for 10 seconds. Immediately thereafter, the unadhered powder composition was discharged. After 10 seconds, the powder composition for the adhesive layer prepared in Reference Example 4 was powdered over the molten powder composition which was adhered to the molding surface of the mold and maintained for 15 seconds. Immediately thereafter, the unadhered powder composition was discharged.

Then, the mold carrying the two layers of the powder compositions was placed in an oven kept at 250° C. and heated for 120 seconds. Thereafter, the mold was taken out from the oven and cooled, and a composite layer consisting of the skin. material of 0.8 mm in thickness and the foam adhesive layer of 2.1 mm in thickness was removed from the mold.

Production of a multi-layer molded article

In the same manner as in Example 7 except that the above obtained composite layer was used in place of the composite layer of the skin material and the non-foam adhesive layer, a multi-layer molded article was produced, and subjected to a 180 degree peel test at 20° C. at a peeling rate of 200 mm/min. The result is shown in Table 3.

Example 17

In the same manner as in Example 16 except that an expandable powder composition for an adhesive layer, which was prepared in the similar method to that of Reference Example 4 but using adipic acid (10 wt. parts) instead of terephthalic acid, was used in place of the powder composition for the adhesive layer prepared in Reference Example 4, a multi-layer molded article was produced. The result is shown in Table 3.

Example 18

In the same manner as in Example 16 except that an expandable powder composition for an adhesive layer, which was prepared in the similar method to that of Reference Example 4 but using phthalic acid (2 wt. parts) instead of terephthalic acid, and azodicarbonamide having a decomposition temperature of 150° C. (CAP-500 manufactured by Sankyo Chemical Co-, Ltd.) (5 wt. parts) instead of CELLMIC C-121, was used in place of the powder composition for the adhesive layer prepared in Reference Example 4, a multi-layer molded article was produced. The result is shown in Table 3.

Example 19

In the same manner as in Example 16 except that an expandable powder composition for an adhesive layer, which was prepared in the similar method to that of Reference Example 4 but using a powder of an ethylene-acrylic acid copolymer containing 90 wt. % of ethylene units and 10 wt. % of acrylic acid units and having a weight average molecular weight of 20,000 and MFR(190) of 7 g/10 min. (YUKALON A-210 M (manufactured by Mitsubishi Chemical Co., Ltd.) (40 wt. parts) instead of terephthalic acid, was used in place of the powder composition for the adhesive layer prepared in Reference Example 4, a multi-layer molded article was produced. The result is shown in Table 3.

Example 20

In the same manner as in Example 16 except that an expandable powder composition for an adhesive layer, which was prepared in the similar method to that of Reference Example 4 but using a powder of polyacrylic acid having a weight average molecular weight of 20,000 (5 wt. parts) instead of terephthalic acid, was used in place of the powder composition for the adhesive layer prepared in Reference Example 4, a multi-layer molded article was produced. The result is shown in Table 3.

Comparative Example 5

In the same manner as in Example 16 except that an expandable powder composition for an adhesive layer, which was prepared in the similar method to that of Reference Example 4 but using no terephthalic acid, was used in place of the powder composition for the adhesive layer prepared in Reference Example 4, a multi-layer molded article was produced. The result is shown in Table 3.

Comparative Example 6

In the same manner as in Example 16 except that the expandable powder composition prepared in Reference Example 2 was used in place of the powder composition for the adhesive layer prepared in Reference Example 4, a multi-layer molded article was produced. The result is shown in Table 3.

TABLE 3

| Example No. | Peel strength (gf/20 mm) |
| --- | --- |
| Example 16 | 700 |
| Example 17 | 1080 |
| Example 18 | 520 |
| Example 19 | 560 |
| Example 20 | 1200 |
| Comp. Ex. 5 | 150 |
| Comp. Ex. 6 | 120 |

Example 21

As shown in FIG. 1, in a container 1, a powder composition 3 for a surface layer of a skin layer which was obtained in the same manner as in Reference Example 1 was charged. An opening of a mold 2 for powder molding which has a leather grain decoration and had been heated to 240° C. was mated with an opening of the container as shown in FIG. 1. Around the mated openings, a frame was fixed to integrate the container 1 and the mold 2.

Then, the integrated container 1 and mold 2 were rotated for 5 seconds using an uniaxial rotator to supply the powder composition 3 into the mold 2 to adhere the powder composition to the molding surface having the leather grain decoration. After stopping the rotation, the excessive powder composition was recovered in the container 1.

The container 1 was detached from the mold 2. Then, other container 1 containing the powder composition for the adhesive layer which was obtained in the same manner as in Reference Example 3 was attached to the mold 1 to integrate them together. Again, the integrated other container 1 and mold 2 were rotated for 15 seconds using the uniaxial rotator to adhere the powder composition for the foam layer to the molten layer of the powder composition 3 on the molding surface of the mold 3. After stopping the rotation, the excessive powder composition was recovered in the other container 1.

Figure 6:
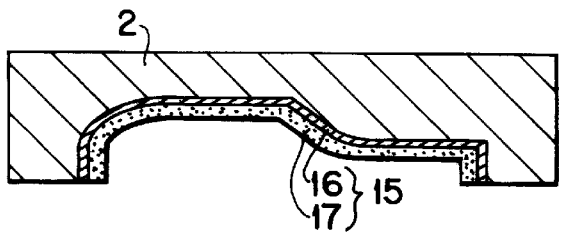
FIG. 6 is a cross sectional view of a mold for powder molding which carries, on its inner surface, a composite layer of a skin material layer and a foam adhesive layer.

Then, the other container 1 was detached from the mold 2, and the mold 2 was heated in an oven at 240° C. for two minutes to shape the foam adhesive layer. The mold 2 was removed from the oven and cooled to obtain a composite layer 15 consisting of the skin material 16 and the foam adhesive layer 17 as shown in FIG. 6.

Figure 7:
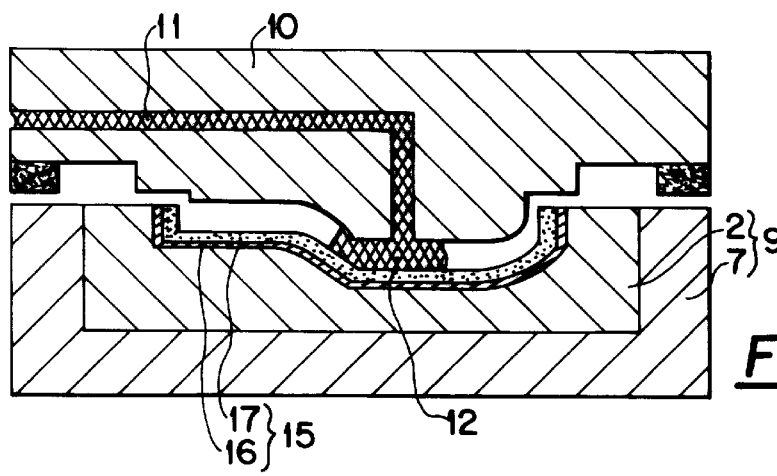
FIG. 7 is a cross sectional view of a mold in which the mold for powder molding the skin material which carries the composite of the skin material and the adhesive layer is integrated with a mold base, and then a melt of a propylene resin is supplied in a mold cavity through a resin conduit provided in a male mold.

As shown in FIG. 7, the mold. 2 for powder molding which carried the composite layer 15 was inserted in a mold base 7 to set up a female mold 9.

Thereafter, as shown in FIG. 7, while the female mold 9 and a male mold were in the unclosed state, a propylene resin melt 12 was supplied between the composite layer 15 and the male mold 10 through a resin conduit 11.

As the propylene resin melt, a polypropylene resin (SUMITOMO NOBLEN AX 568 manufactured by Sumitomo Chemical Co., Ltd. MFR(190)=65 g/10 min.), which was heated to 190° C., was used.

Figure 8:
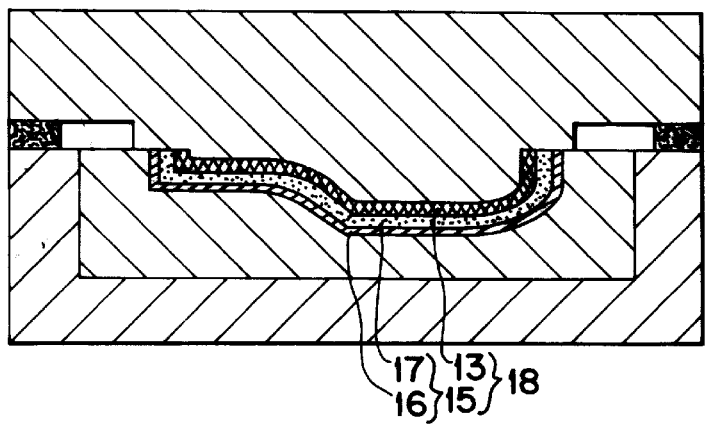
FIG. 8 shows the state of the mold after male and female molds are closed and the shaping of the multi-layer molded article is finished.

The, the molds were closed under a pressure of 50 kg/cm$^2$ on the molding surface to finish the molding of the propylene resin melt 12. Thereby, as shown in FIG. 8, a multi-layer molded article 18 consisting of the skin material 16, the adhesive layer 17 and the propylene resin core 13 which were integrated together was obtained.

Figure 9:
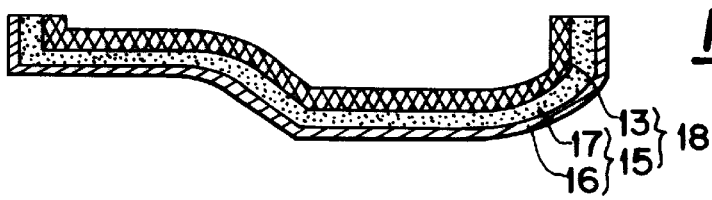
FIG. 9 is a cross sectional view of another example of the multi-layer molded article comprising the skin material layer, the adhesive layer and the core.

FIG. 9 shows a cross section of the obtained multi-layer molded article in the mold closing direction. The thicknesses of the skin material and the adhesive layer were 0.5 mm and 1.2 mm, respectively, and the thickness of the propylene resin core was 2.3 mm. On the skin material, the leather grain was clearly transferred, and the multi-layer molded article had good appearance. When the peeling of the skin material from the article was tried, the skin material was not peeled off but was broken.

What is claimed is:

1. A method for producing a multi-layer molded article comprising a skin material layer made of a vinyl chloride resin, a propylene resin core, and an adhesive layer present between said skin material layer and said core, in which said adhesive layer comprises:

(A) a layer having
  (a) a first sublayer comprising 30 to 90 wt. % of a polyester resin, and a rest of an epoxy group-containing ethylene copolymer and optionally an ethylene copolymer, which is bonded to said skin material of the vinyl chloride resin, and (b) a second sublayer comprising at least one copolymer selected from the group consisting of an ethylene copolymer and an epoxy group-containing copolymer, and optionally a polyolefin, which is bonded to said propylene resin core, or (B) a layer obtained from an ethylene resin composition comprising 100 wt. parts of an epoxy-group containing copolymer (c) which comprises 20 to 99.9 wt. % of ethylene units, 0.1 to 30 wt. % of unsaturated carboxylic acid glycidyl ester units or unsaturated glycidyl ether units, and 0 to 50 wt. % of an ethylenically unsaturated ester units other than the unsaturated carboxylic acid glycidyl ester units, 0.1 to 50 wt. parts of a polybasic carboxylic acid having at least two carboxyl groups, and optionally 0.1 to 20 wt. parts of a heat decomposable blowing agent, which method comprises steps of:

laminating a composite layer of said vinyl chloride resin skin material and said adhesive layer which are integrally laminated, on said propylene resin which has been preheated to a temperature higher then its melting point, with said adhesive layer of said composite layer facing said propylene resin, and pressing them, and wherein said composite layer is produced by powder slush molding.

2. The method according to claim 1, wherein said adhesive layer is said layer (B).

3. A method for producing a multi-layer molded article comprising a skin material layer made of a vinyl chloride resin, a propylene resin core, and an adhesive layer present between said skin material layer and said core, in which said adhesive layer comprises:

(A) a layer having
  (a) a first sublayer comprising 30 to 90 wt. % of a polyester resin, and a rest of an epoxy group-containing ethylene copolymer and optionally an ethylene copolymer, which is bonded to said skin material of the vinyl chloride resin, and
  (b) a second sublayer comprising at least one copolymer selected from the group consisting of an ethylene copolymer and an epoxy group-containing copolymer, and optionally a polyolefin, which is bonded to said propylene resin core, or (B) a layer obtained from an ethylene resin composition comprising 100 wt. parts of an epoxy-group containing copolymer (c) which comprises 20 to 99.9 wt. % of ethylene units, 0.1 to 30 wt. % of unsaturated carboxylic acid glycidyl ester units or unsaturated glycidyl ether units, and 0 to 50 wt. % of an ethylenically unsaturated ester units other than the unsaturated carboxylic acid glycidyl ester units, 0.1 to 50 wt. parts of a polybasic carboxylic acid having at least two carboxyl groups, and optionally 0.1 to 20 wt. parts of a heat decomposable blowing agent, which method comprises steps of:

supplying a composite layer of said vinyl chloride resin skin material and said adhesive layer which are integrally laminated between molding surfaces of male and female molds, supplying a melt of said propylene resin between said composite layer and a molding surface of one of male and female molds which is present on a side of said adhesive layer of said composite layer, and closing said male and female molds, and wherein said composite layer is produced by powder slush molding.

4. The method according to claim 3, wherein said adhesive layer is said layer (B).

5. A method for adhering a vinyl chloride resin and a propylene resin comprising steps of:

laminating a composite layer of a layer of said vinyl chloride resin and an adhesive layer which are integrally laminated, on said propylene resin which has been preheated to a temperature higher then its melting point, with said adhesive layer of said composite layer facing said propylene resin, wherein said adhesive layer comprises:

(A) a layer having
  (a) a first sublayer comprising 30 to 90 wt. % of a polyester resin, and a rest of an epoxy group-containing ethylene copolymer and optionally an ethylene copolymer, which is bonded to said skin material of the vinyl chloride resin, and
  (b) a second sublayer comprising at least one copolymer selected from the group consisting of an ethylene copolymer and an epoxy group-containing copolymer, and optionally a polyolefin, which is bonded to said propylene resin core, or (B) a layer obtained from an ethylene resin composition comprising 100 wt. parts of an epoxy-group containing copolymer (c) which comprises 20 to 99.9 wt. % of ethylene units, 0.1 to 30 wt. % of unsaturated carboxylic acid glycidyl ester units or unsaturated glycidyl ether units, and 0 to 50 wt. % of an ethylenically unsaturated ester units other than the unsaturated carboxylic acid glycidyl ester units, 0.1 to 50 wt. parts of a polybasic carboxylic acid having at least two carboxyl groups, and optionally 0.1 to 20 wt. parts of a heat decomposable blowing agent, and pressing them, and wherein said composite layer is prepared by powder slush molding.

6. The method according to claim 5, wherein said adhesive layer is said layer (B).

7. A method for adhering a vinyl chloride resin and a propylene resin comprising steps of:

supplying a composite layer of a layer of said vinyl chloride resin and an adhesive layer which are integrally laminated between molding surfaces of male and female molds, wherein said adhesive layer comprises:

(A) a layer having
  (a) a first sublayer comprising 30 to 90 wt. % of a polyester resin, and a rest of an epoxy group-containing ethylene copolymer and optionally an ethylene copolymer, which is bonded to said skin material of the vinyl chloride resin, and
  (b) a second sublayer comprising at least one copolymer selected from the group consisting of an ethylene copolymer and an epoxy group-containing copolymer, and optionally a polyolefin, which is bonded to said propylene resin core, or (B) a layer obtained from an ethylene resin composition comprising 100 wt. parts of an epoxy-group containing copolymer (c) which comprises 20 to 99.9 wt. % of ethylene units, 0.1 to 30 wt. % of unsaturated carboxylic acid glycidyl ester units or unsaturated glycidyl ether units, and 0 to 50 wt. % of an ethylenically unsaturated ester units other than the unsaturated carboxylic acid glycidyl ester units, 0.1 to 50 wt. parts of a polybasic carboxylic acid having at least two carboxyl groups, and optionally 0.1 to 20 wt. parts of a heat decomposable blowing agent, supplying a melt of said propylene resin between said composite layer and a molding surface of one of said male and female molds which is present on a side of said adhesive layer of said composite layer, and closing said male and female molds, and wherein said composite layer is prepared by powder slush molding.

8. The method according to claim 7, wherein said adhesive layer is said layer (B).

* * * * *